Patented Jan. 10, 1939

2,143,380

UNITED STATES PATENT OFFICE 2,143,380

PRODUCTION OF OLEFINES

Hans Klein, Mannheim, Ferdinand Haubach, Ludwigshafen-on-the-Rhine, and Wilhelm Hofeditz, Mannheim, Germany, assignors to I. G. Farbenindustrie Aktiengesellschaft, Frankfort-on-the-Main, Germany No Drawing. Application June 23, 1936, Serial No. 86,824. In Germany June 14, 1935

4 Claims. (Cl. 260—683)

The present invention relates to improvements in the manufacture and production of olefines. By heating gaseous or vaporous saturated hydrocarbons hereinafter collectively referred to as vaporized saturated hydrocarbons to obtain olefines, considerable amounts of hydrogen are obtained, usually about as much would be expected from the dehydrogenation reaction. If the same reaction be carried out in the presence of oxygen, the hydrogen burns wholly or for the most part.

We have now found that the preparation of olefines may be carried out with special advantage by heating vaporized saturated hydrocarbons to at least 800° C. while adding relatively large amounts of oxygen, the amount of oxygen and the temperature being so selected that the hydrogen set free during the formation of the olefines is retained either wholly or for its major portion. The conditions to be adopted for any particular starting material may be readily ascertained by preliminary experiments. Thus, for example, in the case of propane an amount of from 25 to 33 parts of oxygen calculated on 100 parts of a mixture of propane and oxygen is sufficient, whereas with ethane a larger amount of oxygen is employed, for example from about 30 to 40 parts of oxygen for 100 parts of a mixture of ethane and oxygen. When treating ethane the temperature is by 20° to 40° C. higher than when treating propane.

By working according to this invention, not only is the amount of hydrogen formed during the formation of the olefine wholly or for the most part retained, but an additional formation of hydrogen may take place by side reactions so that the final gas contains more hydrogen than corresponds to the formation of the olefine.

According to this invention there is obtained a gas mixture which by reason of the presence of large amounts of valuable hydrogen may be used after separation of the olefines for reduction reactions. When starting for example from ethane, the hydrogen content of the reaction gas amounts to about 30 per cent by volume or more. By the removal of the olefines, as for example by absorption with sulphuric acid, the hydrogen content in the residual gas rises to from 45 to 50 per cent or more. Since carbon monoxide is also contained in the residual gas, it may be employed for carbon monoxide reducing processes for the purpose of preparing hydrocarbons or methanol or the like, the more so since the amounts of carbon monoxide and hydrogen are approximately in the ratio of 1:2 which is desirable for the said purpose.

The reaction may be carried out in tubes or reaction chambers of other shapes which may be empty or charged with filler bodies. Substances having catalytic action may also be used as the material for the walls of the reaction chamber and for the filler bodies. The time during which the gases remain in the reaction chamber depends on the temperature and the concentration of oxygen and may vary within wide limits.

The following examples will further illustrate the nature of this invention but the invention is not restricted to these examples. The parts are by volume.

Example 1

A mixture of 70 parts of ethane and 30 parts of oxygen is charged through a quartz tube at 870° C. Ethylene, water, carbon monoxide and hydrogen are formed, 56 parts of ethylene and 56 parts of hydrogen being formed for each 100 parts of ethane. The amounts of carbon monoxide and hydrogen formed are in the ratio of 1:2.

By working at 750° C. with a mixture of 80 parts of ethane and 20 parts of oxygen under otherwise identical conditions, the yield of ethylene is 38 parts and the amount of hydrogen is only 24 parts for each 100 parts of ethane employed.

Example 2

By heating 75 parts of propane and 25 parts of oxygen to 850° C., a mixture of hydrogen, methane, ethylene, propylene, carbon monoxide and water is formed. This mixture contains 30 parts of hydrogen, 20 parts of propylene and 54 parts of ethylene for each 100 parts of propane used.

If, on the other hand, a mixture of 88 parts of propane and 12 parts of oxygen be led at 750° C. through a quartz tube, only 16 parts of hydrogen together with 23 parts of propylene and 32 parts of ethylene are formed for each 100 parts of propane employed.

What we claim is:

1. In the process for the production of olefines from vaporized saturated hydrocarbons other than methane the steps which comprise heating such hydrocarbon together with a relatively large amount of oxygen to a temperature of at least 800° C. but below that at which substantial amounts of acetylene are formed under the conditions obtaining and selecting the amount of oxygen and the temperature so that at least the most part of the amount of hydrogen formed during the formation of the olefine is retained the amount of oxygen decreasing as the molecular weight of the vaporized saturated hydrocarbon increases and being from about 30 to 40 parts of oxygen for each 100 parts of the mixture of vaporized hydrocarbon and oxygen when the vaporized hydrocarbon is ethane.

2. In the process as claimed in claim 1 carrying out the conversion in reaction chambers charged with filler bodies.

3. In the process as claimed in claim 1 carrying out the conversion in reaction chambers charged with filler bodies catalytically promoting the said ocnversion.

4. In the process as claimed in claim 1 carrying out the conversion in reaction chambers the internal surface of which consists of a material having catalytic action in the said conversion.

HANS KLEIN.
FERDINAND HAUBACH.
WILHELM HOFEDITZ.